3,556,718
FREE FLOWING MIXTURES CONTAINING SODIUM CHLORIDE AS PREDOMINANT COMPONENT

Rudolf Bachmann and Leonore Gentsch, Hannover, Germany, assignors to Salzdetfurth Aktiengesellschaft, Hannover, Germany
No Drawing. Filed Aug. 31, 1967, Ser. No. 664,608
Int. Cl. C01d 3/26
U.S. Cl. 23—89                                      7 Claims

ABSTRACT OF THE DISCLOSURE

Free flowing mixtures containing subdivided sodium chloride as a predominant component having 0.0001 to 1 weight percent of a morpholine compound selected from the group consisting of compounds of the formula $$R-N \begin{matrix} CH_2-CH_2 \\ \diagup \quad \diagdown \\ \diagdown \quad \diagup \\ CH_2-CH_2 \end{matrix} O$$

wherein R is selected from the group consisting of alkyl and alkenyl of 6 to 22 carbon atoms and the water soluble salts thereof with strong acids in intimate admixture therewith as a caking inhibitor.

BACKGROUND OF THE INVENTION

Sodium chloride is obtained in crystalline form either from natural sources in the form of a so-called rock salt or in the form of so-called common salt by evaporating solutions containing sodium chloride. The sodium chloride crystals obtained in this way have however the tendency to cake together during storage to form larger agglomerates and finally compact masses. This tendency on the part of sodium chloride is a considerable technical disadvantage as before the caked sodium chloride can be used for most normal purposes, it must first be transformed into a flowing product by additional measures.

The reasons for this caking together are the continually changing climatic conditions to which the stored sodium chloride is exposed, and small quantities of impurities which cause strong hygroscopicity of the sodium chloride. When a "critical" relative humidity is exceeded in the atmosphere, the sodium chloride absorbs moisture with which it forms a highly concentrated sodium chloride solution at the surface of the individual crystals. The "critical" relative humidity of the atmosphere is dependent on the numerical value of the relative humidity and on the temperature. When the humidity of the air decreases or when the storage temperature rises, solid sodium chloride recrystallizes out of the highly concentrated solution at the surface of the sodium chloride crystals. This separating solid sodium chloride unites adjacent sodium chloride crystals by crystal bridges which, after manifold repetition of the dissolving and recrystallizing process, become so solid that the original loose crystals grow together to form a solid mass. At very low temperatures it may also be possible that the sodium chloride crystals "freeze together" whereby in addition to ice, salt crystals, evidently hydrates, are also formed from the solution around the sodium chloride crystals. The crystalline hydrates however are only stable at these low temperatures.

The sodium chloride crystals can be prevented from caking together during storage however by dusting these crystals with very finely divided inert powders which, in most cases, have a large surface area and if desired can be water-absorbent or water-repellent. These so-called separation substances provide effective separation of the individual sodium chloride crystals and reduce the quantity of the concentrated solution which forms on the surface of the sodium chloride crystals. This type of caking inhibitor, however, is not water-soluble so that a clear solution is not obtained when the sodium chloride crystals coated therewith are dissolved. Separation of the undissolved powdery substances from such solutions is troublesome and uneconomical. In addition, separation of the finely divided powdery substances from the coarser sodium chloride crystals cannot be prevented when mixtures of this type are handled and moved, whereby the sodium chloride crystals again tend to have increased tendency to cake.

These separations do not occur if sodium chloride crystals are treated with water-soluble alkali ferri- or ferrocyanides. The addition of these cyanides causes the recrystallizing sodium chloride to crystallize out in the form of dendrites of low strength rather than in the normal cubic system of high mechanical strength. The dendritic bridges formed between the sodium chloride crystals may easily be destroyed by mechanical action. Other water-soluble complex heavy metal cyanides of water-soluble ferrioxalates are said to have the same effect. Most compounds of this type may however cause undesired discoloration phenomena if they have the opportunity of reacting with metal oxides, in particular iron oxides.

Sodium hexametaphosphates have already been used as caking inhibitors for sodium chloride. However, these water-soluble polymeric phosphates, in common with other water-soluble caking inhibitors, have the disadvantage that they are liable to be washed out. Due to this washing out the caking inhibitors accumulate in the bottom layers of the heap stored sodium chloride in the course of time, while the top layers of the heap are impoverished and cake to an increasing degree.

This disadvantage was to be eliminated by applying ferri-ferrocyanides which are insoluble in or difficult to dissolve in water to the sodium chloride crystals. In this case, however, the uniform application of these substances causes technical difficulties. A washing out effect was also observed to a slight extent with these compounds.

According to another disclosure, it is indicated that this washing out effect practically does not occur in products which are produced by reacting equimolar quantities of a fatty acid with at least 6 carbon atoms, ammonia and urea at temperatures of from 100 to 200° C. and which contain the groupings $$-CO-N-CO \atop R$$

$$-CO-N \diagdown {R^1 \atop R^2}$$

$$-CO-N-C=N- \atop R$$

These products have the advantages over all other caking inhibitors that they considerably reduce the tendency of the sodium chloride stored at low temperature to freeze together and are only washed out to a very slight degree.

However, these products originating in an uncontrolled reaction can only be used to treat sodium chloride which is not to be used for nutritional purposes.

SUMMARY OF THE INVENTION

It is an object of the invention to provide caking inhibitors for sodium chloride which have a homogeneous and chemically defined composition and are physiologically harmless when used for nutritional purposes. It furthermore is an object of the invention to provide caking inhibitors which do not wash out with water and can also be applied in liquid form.

The invention accordingly provides free flowing mixtures which contain sodium chloride as the predominant component and caking inhibitors. Characteristic of these mixtures is a content of from 0.0001 to 1.0% by weight of compounds of the general Formula I

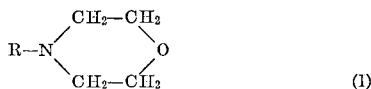

in which R stands for a straight chain or branched paraffinic or olefinic hydrocarbon residue with 6 to 22 C atoms, or of corresponding amounts of salts of these compounds with strong acids as caking inhibitors, that is, acids having an electrolytic dissociation constant of at least $1.7 \times 10^{-5}$.

DETAILED DESCRIPTION OF THE INVENTION INCLUDING PREFERRED EMBODIMENTS

The anticaking compounds according to the invention are N-alkyl or N-alkenyl morpholines in which the alkyl or alkenyl groups contain 6 to 22 carbon atoms. Examples of such alkyl and alkenyl groups, for instance, are lauryl, palmityl, stearyl and oleyl radicals.

The morpholines with shorter residues R are mostly liquid to pasty substances. They may be sprayed onto the agitated sodium chloride crystals as such. If it should be necessary, the pasty forms of the morpholines may be slightly warmed for this purpose, in order to lower their viscosity.

The morpholines may, however, be dissolved in organic solvents of lower viscosity, e.g., methyl alcohol or ethyl alcohol or chloroform or carbon tetrachloride, benzene and sprayed onto the sodium chloride crystals in the form of a solution. Light highly fluid mineral oils or petroleum, which frequently have been used to render sodium chloride unsuitable for nutritional purposes also are suitable solvents for morpholines. The morpholines therefore may also be applied in the form of these solutions to the sodium chloride crystals when they are, for example, to be used as scatter salts in snowy and icy conditions. When volatile solvents are used, these may be evaporated after the solution has been applied to the sodium chloride crystals so that a free flowing dry sodium chloride is produced as an end product. The sodium chloride treated in this manner may be used directly for nutritional purposes, for instance, to preserve foodstuffs, in particular to preserve cucumbers, cabbage or meat, or may be used as a cooking salt.

Sodium chloride which has been previously treated with an aqueous solution of morpholine salts can be used in nearly the same manner. These salts are obtained by nearly or completely neutralizing the free N-substituted morpholine bases with strong acids, such as hydrochloric acid, sulphuric acid, nitric acid, phosphoric acid, acetic acid or the like. These salts may also be dissolved in aqueous calcium or magnesium chloride solutions. These salts present a surprisingly good degree of solubility when in concentrated calcium and magnesium chloride solutions. They reinforce the anticaking effect of calcium or magnesium chloride, which is not very good in itself, to an unexpected degree. In particular, mixtures which contain sodium chloride as the predominant component and were treated with morpholine salts dissolved in calcium or magnesium chloride solution remain free flowing even at low temperatures.

The solutions of the morpholine compounds (including their salts or the morpholines alone are to be sprayed onto briskly agitated sodium chloride crystals in extremely finely divided form in quantities such that the sodium chloride contains from 0.0001 to 1.0 weight percent, preferably 0.0025 to 0.025 weight percent. When the morpholine compounds are used in combination with magnesium or calcium chloride the quantity of magnesium or calcium chloride is such as to provide 1 to 40 kg. thereof per 1000 kg. of sodium chloride, that is 0.1 to 4 weight percent based on the sodium chloride.

According to the invention, both rock salt and the common salt obtained by evaporating aqueous sodium chloride solutions may be treated. In any event the sodium chloride crystals remain free flowing even after a long period of storage and undergo no discoloration. Even during storage at decidedly low temperatures of from $-20$ to $-30°$ C. sodium chloride crystals treated according to the invention do not freeze together. There is no washing out of the morpholines or salts thereof which are sprayed onto the sodium chloride crystals, even upon extended storage of this sodium chloride. It is of advantage in the case of sodium chloride which is used as scatter salts which often is stored under insufficient cover, if it is sprayed with non-water-soluble morpholine compounds.

Common salt treated according to the invention may be dissolved in water and diluted acetic acid to form clear and residue-free solutions which may be used for the treatment of foodstuffs. The sodium chloride treated according to the invention and the solutions produced therefrom are not subject to discoloration if they come into contact with heavy metals or salts thereof. Toxic effects are not caused by sodium chloride treated according to the invention.

Without being restricted thereto, the method according to the invention is illustrated hereinafter by way of the following examples. In such examples mixtures of compounds of the general formula

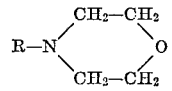

are used.

The mixture designated hereinafter as "addition mixture A" contains the following percentage by weight of the various substituted morpholine compounds identified by the R substituent

| | Weight percent |
|---|---|
| $R=CH_3-(CH_2)_7CH=CH-(CH_2)_8-$ | 40 |
| $R=CH_3(CH_2)_{15}-$ | 27 |
| $R=CH_3(CH_2)_{17}-$ | 20 |
| $R=CH_3(CH_2)_{13}-$ | 7 |

The salt mixture obtained from this mixture by neutralization with hydrochloric acid is designated hereinafter "addition mixture A·HCl."

The mixture designated hereinafter "addition mixture B" contains the following percentage by weight of the various substituted morpholine compounds again identified by the R substituent

| | Weight percent |
|---|---|
| $R=CH_3(CH_2)_{11}-$ | 50 |
| $R=CH_3(CH_2)_{13}-$ | 21 |
| $R=CH_3(CH_2)_{15}-$ | 6 |
| $R=CH_3(CH_2)_7-$ | 6 |
| $R=CH_3(CH_2)_9-$ | 9 |
| $R=CH_3(CH_2)_{17}-$ | 6 |
| $R=CH_3(CH_2)_7CH=CH(CH_2)_8-$ | 5 |

The salt mixture produced by neutralization of this mixture with hydrochloric acid is designated hereinafter "addition mixture B·HCl."

EXAMPLES 1 TO 3

In each instance 1000 parts by weight of rock salt with a grain size of less than 0.75 mm. were sprayed in a high speed twin shaft mixer with the quantities of addition mixture A given below which were preheated to a temperature of 40° C. The mixtures obtained were stored in a storage shed in paper bags containing 50 kg. The following findings resulted after 3 months:

| Addition mixture A quantity in g./ton of salt | Hardened surface crust thickness in mm. |
|---|---|
| 0 | 150 crust not impressable. |
| 25 | 25 crust easily impressable. |
| 50 | 10 crust easily impressable. |

A portion of each of the mixtures was exposed for 8 weeks to a moist and acid air atmosphere (mean relative humidity of the air 80%) with which loose loaded rock salt generally comes into contact. These samples remained free flowing and underwent no discoloration.

Another portion of each of the mixtures was deposited around an unprotected iron girder and left there for 8 weeks. Even after this period the samples underwent no discoloration or hardening. In contrast to this, rock salt treated with potassium ferrocyanide exhibits a blue discoloration with slight hardening of the surface of the stored material.

EXAMPLES 4 TO 5

Addition mixture B was used under otherwise identical conditions instead of the addition mixture A used in Examples 1 to 3.

| Addition mixture B quantity in g./ton of salt | Hardened surface crust thickness in mm. |
|---|---|
| 25 | 45 crust easily impressable. |
| 50 | 20 crust easily impressable. |

EXAMPLES 6 TO 18

In each instance 1000 parts by weight of rock salt with a grain size of less than 0.75 mm. were treated as stated in Example 1 with the addition mixtures A and B as well as A·HCl and B·HCl in the quantities given below. The addition mixtures A·HCl and B·HCl were used in this case in the form of a 10% aqueous solution. Specimens from the products obtained were filled into moulds and then exposed to the following treatment:

(a)—24 hours at 50° C. and 90% relative air humidity,
(b)—12 hours cooling to 20° C. at 90% relative air humidity,
(c)—24 hours at 50° C. and 30% relative air humidity,
(d)—12 hours cooling to 20° C. at 30% relative air humidity.

The treatment according to (a) to (d) was carried out altogether three times in succession. The specimens were then subjected, in a storage shed, for 2 weeks to a pressure loading of 1 kg./cm.$^2$.

| Addition mixture Type | Parts, g./ton | Crushing pressure, kg./cm.$^2$ |
|---|---|---|
|  | 0 | 0.70 |
| A | 25 | 0.20 |
| B | 25 | 0.25 |
| A | 50 | 0.05 |
| B | 50 | 0.10 |
| A | 200 | 0 |
| B | 200 | 0 |

EXAMPLES 19 TO 21

1000 parts by weight of industrial salt with a grain size of up to 3 mm. were treated in the same manner as in Example 1 with the quantities given below of addition mixtures A and B and stored under a roof both in loose heaps and in bags. The addition mixtures A or B were sprayed on in the form of a 20% solution in a mineral oil having the following characteristics:

Density:
  12°—0.8110
  40°—0.8109
Flash point—46–48° C.
Boiling point:
  Beginning—160–165° C. (80% above 200° C.)
  End—230–240° C.

EXAMPLE 22

After the periods of time which, in the most unfavorable case, the salt was at most crusted in the surface.

2.5 kg. of a solution comprising 0.25 kg. of tallow fat morpholine neutralized with HCl and 2.25 kg. of water were dissolved at room temperature in 15 l. of discard solution from the treatment of carnallite, containing besides 13.5 kg. of water, 5.0 kg. of magnesium chloride, 0.2 kg. of sodium chloride, 0.2 kg. of potassium chloride and 0.5 kg. of magnesium sulphate. This solution mixture was sprayed in a suitable mixing apparatus onto 1000 kg. of rock salt in the range of grain sizes usual for thawing salt and lying between 0 and a maximum of 5 mm.

The same experiment was repeated using coco morpholine neutralized with HCl. The salt treated in this way was stored for several weeks in an open warehouse during the winter. It was exposed to the influence of fog and humidity as well as temperature above and below freezing point. During the free storage, apart from a thin and easily crushable crust, the salt showed no signs of hardening. In spite of the variations in climate, it remained loose and could still be scattered.

The tallow fat morpholine and coco morpholine used were respectively mixtures of N-substituted morpholines obtained from the mixture of alkanes and alkenes derived from the fatty acids of tallow fat and coconut oil.

EXAMPLE 23

(a) Rock salt in the grain size usual for thawing salt was prepared with the addition mixture A·HCl or B·HCl so that 1000 kg. of salt is sprayed and mixed with 2 kg. of this mixture. Samples of the salt treated in this way are wetted with water, increasingly from 0.5 to 5%.

(b) 2 kg. of the addition mixture A·HCl or B·HCl were added to 15 l. of MgCl$_2$ liquor, containing 390 gl. of MgCl$_2$ and this solution was mixed with 1000 kg. of rock salt. Samples of this salt were also wetted with water, also increasingly from 0.5 to 5%.

The experiments shown in the table indicate that without the addition of MgCl$_2$ liquor the salt already begins to "freeze together" with a moisture content of 1%, but in the presence of MgCl$_2$ liquor, the salt only begins to "freeze together" with a moisture content of 4%. That this phenomenon is freezing together and not hardening may be seen from the fact that when freezing point is reached, the "hardened" samples again become soft and may be scattered.

| | Temperature −15° C. | | | |
|---|---|---|---|---|
| | Without MgCl$_2$ liquor | | With MgCl$_2$ liquor | |
| Added water, quantity | After 24 h. | After 36 h., crushing strength, kg./cm.$^2$ | After 24 h. | After 26 h., crushing strength, kg./cm.$^2$ |
| 0 | Soft | | 0 Very soft | 0 |
| 0.5 | do | | 0 do | 0 |
| 1.0 | Hardening beginning. | | 0.8 do | 0 |
| 2.0 | Hard | | 1.0 do | 0 |
| 3.0 | Very hard | | 1.5 Soft | 0 |
| 4.0 | do | | 2 Hardening beginning. | 0.8 |
| 5.0 | do | | >2 Hard | 1.3 |

We claim:
1. A free flowing mixture containing subdivided sodium chloride as a predominant component having 0.0001 to 1 weight percent of a morpholine compound selected from the group consisting of compounds of the formula

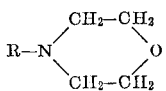

wherein R is selected from the group consisting of alkyl and alkenyl of 6 to 22 carbon atoms and the water soluble salts thereof with strong acids in intimate admixture therewith as a caking inhibitor.

2. A free flowing mixture as in claim 1 which in addition contains 0.1 to 4 weight percent of at least one of the salts magnesium chloride and calcium chloride in intimate admixture therewith.

3. A method of producing the free flowing mixture of claim 1 which comprises applying the morpholine compound in liquid form to the surface of the subdivided sodium chloride.

4. The method of claim 3 in which the morpholine compound is applied in the form of a solution.

5. The method of claim 3 in which said morpholine compound is applied in the form of a solution in an organic solvent of low viscosity.

6. The method of claim 3 in which said morpholine compound is in the form of an aqueous solution of the water soluble salt with a strong acid.

7. A method of claim 6 wherein the aqueous solution contains at least one of the following salts: magnesium chloride and calcium chloride.

References Cited

UNITED STATES PATENTS

| | | | |
|---|---|---|---|
| 2,716,067 | 8/1955 | Fain et al. | 252—70X |
| 2,990,246 | 6/1961 | Scott et al. | 23—89 |
| 3,310,494 | 3/1967 | Sproule et al. | 252—384X |

RICHARD D. LOVERING, Primary Examiner

I. GLUCK, Assistant Examiner

U.S. Cl. X.R.

99—143; 252—70, 383, 384, 390, 394